Patented Nov. 21, 1933

1,936,002

UNITED STATES PATENT OFFICE 1,936,002

PROCESS FOR EXTRACTING MINERALS FROM ORE

Isaac Newton Waggonner and Arthur Esterling Skeats, San Diego, Calif.

No Drawing. Application May 19, 1931
Serial No. 538,622

7 Claims. (Cl. 23—27)

Our invention relates to a process for extracting alumina and the metals of the alkali group from the ores in which they occur, and the objects of our invention are:

First, to provide a process which may be applied equally well to ores containing a single mineral or a mixture of minerals.

Second, to provide a process in which an agent is employed in combination with the ores, which is cheap and which is found in a condition requiring no pre-treatment.

Third, to provide a process in which the various metallic salts obtained from the raw material are readily segregated.

Fourth, to provide a process in which a valuable by-product in the form of a mineral fertilizer is obtained.

Fifth, to provide a process in which the by-product is in a suitable condition for further treatment for the segregation and recovery of other minerals remaining therein.

Sixth, to provide a process requiring a minimum of heat, thereby economizing in fuel.

Seventh, to provide a process involving very simple and inexpensive apparatus for commercial operation.

With these and other objects in view, as will appear hereinafter, our invention consists in certain novel combinations, treatment and procedure as will be hereinafter more specifically described and particularly set forth in the appended claims.

It is well known that great quantities of ores are available in which alumina and metals of the alkali group are present in more or less intermixed relation. These ores include spodumene, lepidolite, amblygonite, triphylite and feldspar. The metals contained in these ores include aluminum, lithium, potassium, sodium, caesium, and rubidium and they frequently occur in such small quantities that the ores have been considered of no commercial value. Frequently these ores are found on mine dumps in a more or less broken up and intermixed state. In order to commercially recover these metals, we have devised a process whereby, without previously segregating the ores, said metals are recovered in the form of salts, and at the same time a large percentage of the residue represents valuable minerals in the form adapted for further successful treatment for the recovery of other valuable elements.

In the first step in our process an admixture of gypsum, or any other form of calcium sulphate, is made with the ore in its intermixed condition, the proportionate quantities of each depending on the amount of the sulphate radical required to change the desired minerals to sulphates. This mixture is best made by grinding the ore and gypsum together to a fineness of twenty mesh or finer.

For convenience in treating with heat the ground mass is then moistened with water to such consistency as will admit it to be formed into lumps or bricks. In this way the volatile compounds are to a considerable degree protected from the action of oxygen while heating and are thereby conserved.

The mixture of ore and gypsum is then heated in a suitable furnace, to the point of incipient fusion. The degree of heat and the length of time required will depend on the proportion of the various minerals in the ore, the type of furnace used, the size of the lumps and the fineness of the grind. The point at which the desired fusion is completed, and should cease, is reached when the lumps or bricks swell and show other visual indications that fusion is beginning to take place.

In treating the ores in their intermixed condition, instead of previously segregating them, fusion is facilitated and the amount of heating therefore reduced while sulphidization is assisted.

By means of this mixture of ore, or ores, and gypsum, and the fusion as described, the alumina, lithium, potassium, sodium, caesium and rubidium, become sulphates, and the phosphates become calcium phosphate.

The heat treated lumps are then lixiviated with water whereby the water soluble sulphates of aluminum, lithium, potassium, sodium, caesium and rubidium are dissolved, while the calcium and calcium phosphate remain in the insoluble residue.

Depending upon the minerals to be recovered the lumps may be lixiviated in their heated condition or first allowed to cool. The final result is not effected but the process may be accelerated or retarded by suitably controlling the temperature.

The liquid from the leaching is conducted to vats where it is evaporated, the sulphate salts crystallizing out in the order of their solubility, until all of the minerals therein are recovered in a proper condition for further refining in accordance with known methods.

Depending upon the mineral contents of the ores used, the residue will contain certain other valuable minerals, and is in a suitable condition for further treatment by conventional methods for the recovery of such minerals.

Furthermore, the residue containing as it does a large percentage of calcium phosphate, represents a valuable mineral fertilizer and may be utilized for this purpose, either directly following our process or after recovery of the other minerals mentioned above. For this purpose the residue is dried and ground to a suitable fineness.

It is obvious that in recovering the metallic salts and alumina by our process we are able to economically utilize ores containing relatively small quantities of the desired minerals, and that the ores may be equally well utilized, whether they contain a single mineral or an intermixture of the minerals thereby avoiding the cost of segregation. Further, it is evident that the agent and solvent used in the process are readily obtainable in any desired quantity at negligible cost, and that the use of relatively expensive chemicals in any step of the process has been dispensed with. It is further obvious that we have devised a process for the recovery of the mineral contents of the ores treated, in which a residue in the form of a valuable by-product is obtained, and thus the entire cost of recovering the relatively small quantities of metallic salts is not borne by the latter.

Having thus described our invention, what we claim as new and desire to secure by Letters Patent is:

1. The process consisting in mixing gypsum with a plurality of unsegregated ores containing alumina and the metals of the alakli group in certain proportions, then heating the mixture, then lixiviating the mixture with water, then drawing off the resulting solution, then recovering the solubles of said solution.

2. The process consisting in mixing gypsum with a plurality of unsegregated ores containing alumina and/or the metals of the alkali group, then grinding the mixture, then heating the ground mixture to a point of incipient fusion, then lixiviating the mixture with water, then drawing off the resulting solution, then recovering the solubles of said solution.

3. The process consisting in mixing gypsum with ores containing alumina and/or metals of the alkali group, then grinding the mixture, then moistening the ground mixture, then forming lumps thereof, then heating the lumps to a point of incipient fusion, then lixiviating the mixture with water, then drawing off the resulting solution, then recovering the solubles of said solution.

4. The process consisting in mixing gypsum with ores containing alumina or metals of the alkali group, then grinding the mixture, then moistening the ground mixture and forming lumps, then heating the lumps to a point of incipient fusion, then lixiviating the mixture with water, then drawing off the resulting solution, then evaporating said solution and crystalizing out the salts dissolved therein.

5. The process consisting in mixing gypsum with a plurality of unsegregated ores containing the metals of the alkali group, then grinding the mixture to a fineness of twenty mesh, then heating the ground mixture to the point of incipient fusion, then lixiviating the mixture with water, then drawing off the resulting solution, then recovering the solubles of said solution.

6. The process consisting in mixing a form of calcium sulphate with a plurality of unsegregated ores containing a desired mineral of the alumina or alkali group or a mixture of such minerals, then grinding said mixture, then heating said ground mixture to a point of incipient fusion, then lixiviating said heated mixture with water, then removing the solution, then recovering the metallic salts from said solution.

7. The process of forming a phosphate bearing fertilizer consisting in mixing gypsum with amblygonite or other phosphate bearing mineral in predetermined proportions, then grinding the mixture, then moistening the ground mixture with water and forming lumps, then heating said lumps in a furnace to the point of incipient fusion thereby forming calcium phosphate.

ISAAC NEWTON WAGGONNER.
ARTHUR ESTERLING SKEATS.